W. P. GILL.
RAIN-WATER STRAINER.
No. 174,227.  Patented Feb. 29, 1876.
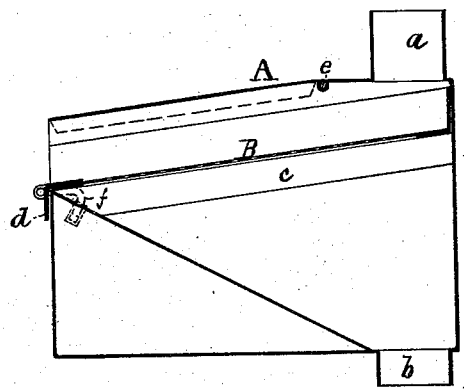
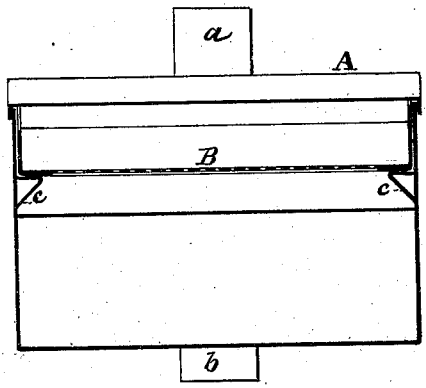

UNITED STATES PATENT OFFICE.

WILLIAM P. GILL, OF ST. LOUIS, MISSOURI.

IMPROVEMENT IN RAIN-WATER STRAINERS.

Specification forming part of Letters Patent No. 174,227, dated February 29, 1876; application filed October 6, 1875.

*To all whom it may concern:*

Be it known that I, WILLIAM P. GILL, of St. Louis, Missouri, have invented certain Improvements in Rain-Water Strainers, of which the following is a specification, reference being had to the accompanying drawing, and to the letters of reference marked thereon.

This invention has for its object the relieving of rain-water, for household purposes, from all extraneous substances, such as leaves, insects, &c., liable to find their way to the gutter-spout at the eaves of a building and be conducted thence through the down-spout into the cistern.

In the annexed drawing, Figure 1 is a vertical section, and Fig. 2 a sectional front view of the invention.

A is a box, having a pipe, $a$, leading from the down-spout, and a pipe, $b$, connecting with the cistern. A part of the bottom of the box inclines back to the pipe $b$, as shown. A strainer, B, covers the entire inner area of the box, and rests upon supports $c$, which are inclined toward the front of the box. The strainer is provided with sides and a back, which fit closely against the sides and back of the box, but is open in front, having an apron, $d$, which turns over the front of the box A. A portion of the top of the box A is hinged, as shown, at $e$, and is for purposes of appearances inclined so as to be parallel with the strainer. The strainer is held to the box A by hooks $f$, but is easily removable.

The device is placed at any desired point in the down-spout. The water and the different extraneous substances pass through the pipe $a$ to the inclined strainer, the water falling to the inclined bottom of the box toward the pipe $b$, through which it enters the cistern. The substances gradually find their way and are washed down the strainer to the open part of the front of the box A, and fall over the apron $d$ to the ground or elsewhere.

I prefer to make the box, &c., of galvanized sheet-iron, and the strainer of fine brass wire-cloth.

Having described my invention, what I claim as new, and wish to secure by Letters Patent of the United States, is—

The box A, having the lid hinged at $e$, and the strainer-supports $c$, and provided with the pipes $a$ and $b$, combined with the inclined bottom and removable strainer B, all arranged substantially as and for the purposes specified.

WILLIAM P. GILL.

Witnesses:
W. B. HEWITT,
C. E. KINYON.